United States Patent Office 3,472,880
Patented Oct. 14, 1969

3,472,880
PROCESS FOR PREPARING ESTRONE
Gunther Kruger, St. Laurent, Montreal, Quebec, Canada, assignor to American Home Products Corporation, New York, N.Y., a corporation of Delaware
No Drawing. Filed July 5, 1967, Ser. No. 651,132
Int. Cl. C07c 167/14, 169/10, 173/00
U.S. Cl. 260—397.4         2 Claims

ABSTRACT OF THE DISCLOSURE

There is disclosed herein a process for preparing estrone, comprising heating 6,19-oxidoandrost-4-ene-3,17-dione at temperatures between 300° C. and 600° C., preferably under reduced pressure and in the presence of finely divided inert materials.

---

The present invention relates to a process for preparing estrone, a powerful, naturally occurring estrogen. It is a particular advantage of my invention that it permits the preparation of estrone from easily available starting materials in good yields.

More specifically, I prefer to use as starting material 6,19-oxidoandrost-4-ene-3,17-dione, which is easily available from dehydroisoandrosterone according to the procedure described by K. Heusler et al., Experientia 18, 464 (1962). The former compound when heated to temperatures between 300° C. and 600° C., preferably under reduced pressure, and in the presence of finely divided inert materials, yields estrone. This pyrolysis may advantageously be carried out in the presence of finely divided materials which do not undergo undesirable chemical or physical changes during the reaction, such as charring, caking, sintering or melting. Such materials may include finely divided glass powder, or a wide variety of metal salts, for example, calcium chloride, lithium chloride or magnesium sulfate.

In particular, 6,19-oxidoandrost-4-ene-3,17-dione is mixed with glass powder or a suitable metal salt, and distilled at temperatures ranging from 300–600° C. and preferably at reduced pressure. Estrone, identical with an authentic sample is isolated from the distillate.

The following formulae and examples will illustrate this invention:

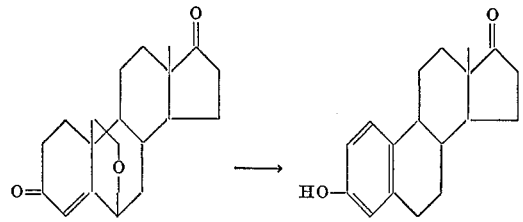

The conversion of the 6,19-oxido-$\Delta^4$-3-ketone to estrone may possibly commence with the enolization of the starting material. The expulsion of a proton from position 1 during the pyrolytic fission of the oxygen-carbon bond in position 6 is thus facilitated:

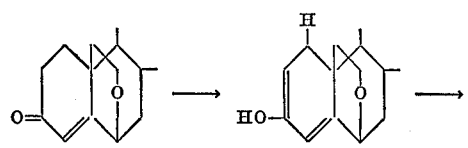

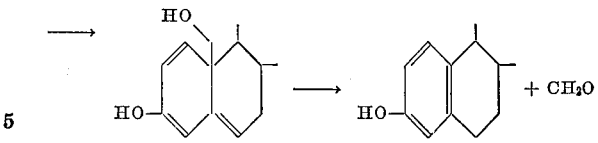

Subsequent rearrangement would then be expected to yield estrone readily as well as formaldehyde.

EXAMPLE 1

A mixture of 1 g. of 6,19-oxidoandrost-4-ene-3,17-dione, and 20 g. of calcium chloride is heated between 350 and 400° C. at 0.1 to 2 mm. Hg pressure. The material which has distilled out of the mixture is chromatographed on silica gel. Elution with benzene-ethyl acetate 4:1 yields estrone, identical with an authentic sample.

EXAMPLE 2

The process outlined in Example 1 is repeated but magnesium sulfate is used instead of calcium chloride. Estrone is obtained as above.

EXAMPLE 3

The process outlined in Example 1 is repeated but lithium chloride is used instead of calcium chloride. Estrone is obtained as above.

EXAMPLE 4

The process outlined in Example 1 is repeated but strontium carbonate is used instead of calcium chloride. Estrone is obtained as above.

EXAMPLE 5

The process outlined in Example 1 is repeated but strontium chloride is used instead of calcium chloride. Estrone is obtained as above.

EXAMPLE 6

The process outlined in Example 1 is repeated but glass powder is used instead of calcium chloride. Estrone is obtained as above.

EXAMPLE 7

The process outlined in Example 1 is repeated but ferrous chloride is used instead of calcium chloride. Estrone is obtained as above.

I claim:
1. The process of preparing estrone which comprises heating 6,19-oxidoandrost-4-ene-3,17-dione in the presence of a finely-divided inert material to a temperature within the range 300° C. to 600° C. at a reduced pressure, less than atmospheric, within the range 0.1 to 2.0 mm. of mercury.
2. The process of preparing estrone, as claimed in claim 1, wherein said finely-divided inert material is selected from the group which consists of finely-divided glass powder and metal salts which do not undergo chemical or physical changes during the heating.

References Cited

Villotti, A. et al.: Journ. Chem. Soc., October 1964, pp. 3621–3624.

LEWIS GOTTS, Primary Examiner

ETHEL G. LOVE, Assistant Examiner

U.S. Cl. X.R.
260—239.55